US011175550B2

(12) United States Patent
Qiao et al.

(10) Patent No.: US 11,175,550 B2
(45) Date of Patent: Nov. 16, 2021

(54) LIQUID CRYSTAL DISPLAY PANEL AND DISPLAY DEVICE

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Yun Qiao, Beijing (CN); Han Zhang, Beijing (CN); Kai Chen, Beijing (CN); Zhen Wang, Beijing (CN); Zhengkui Wang, Beijing (CN); Wenwen Qin, Beijing (CN); Wei Yan, Beijing (CN); Jian Zhang, Beijing (CN); Xiaozhou Zhan, Beijing (CN); Deshuai Wang, Beijing (CN); Jian Sun, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/642,596

(22) PCT Filed: Jan. 4, 2019

(86) PCT No.: PCT/CN2019/070458
§ 371 (c)(1),
(2) Date: Feb. 27, 2020

(87) PCT Pub. No.: WO2020/140280
PCT Pub. Date: Jul. 9, 2020

(65) Prior Publication Data
US 2021/0149262 A1 May 20, 2021

(51) Int. Cl.
*G02F 1/1362* (2006.01)
*G02F 1/1339* (2006.01)

(52) U.S. Cl.
CPC ...... *G02F 1/136286* (2013.01); *G02F 1/1339* (2013.01)

(58) Field of Classification Search
CPC .................................................. G02F 1/1339
See application file for complete search history.

(56) References Cited

U.S. PATENT DOCUMENTS

2016/0202516 A1* 7/2016 Watanabe ............. G02F 1/1339
349/130
2017/0289324 A1 10/2017 Yeo et al.
2018/0186342 A1* 7/2018 Kubota .................. H04N 5/225

FOREIGN PATENT DOCUMENTS

CN 107272242 * 10/2017 .......... G02F 1/1333
CN 107272242 A 10/2017
(Continued)

*Primary Examiner* — Sang V Nguyen
(74) *Attorney, Agent, or Firm* — Leason Ellis LLP

(57) ABSTRACT

A liquid crystal display panel and a display device. The liquid crystal display panel includes a display region and an opening region in the display region; the display region includes a plurality of sub-pixels, the display region includes a first edge and a second edge opposite to the first edge, the display region includes a first region between the opening region and the first edge and a second region between the opening region and the second edge, an orthographic projection of the opening region on the first edge respectively coincides with orthographic projections of the first region and the second region on the first edge, the plurality of sub-pixels comprise a main sub-pixel in the first region and a secondary sub-pixel in the second region, and an area of the main sub-pixel is smaller than an area of the secondary sub-pixel.

14 Claims, 7 Drawing Sheets

(56) References Cited

FOREIGN PATENT DOCUMENTS

| CN | 108885507 | A | 11/2018 | |
| CN | 108931871 | * | 12/2018 | ........... G02F 1/1333 |
| CN | 108931871 | A | 12/2018 | |
| CN | 108965526 | A | 12/2018 | |
| CN | 109119447 | A | 1/2019 | |

* cited by examiner

LIQUID CRYSTAL DISPLAY PANEL AND DISPLAY DEVICE

CROSS-REFERENCE TO RELATED PATENT APPLICATIONS

This application is a U.S. National Stage Application under 35 U.S.C. § 371 of International Patent Application No. PCT/CN2019/070458, filed Jan. 4, 2019, which is incorporated by reference in its entirety.

TECHNICAL FIELD

Embodiments of the present disclosure relate to a liquid crystal display panel and a display device.

BACKGROUND

With the continuous development of smart phone industry, "full-screen" mobile phone, that is, the mobile phone with super high screen-to-body ratio, has become the hot spot and trend of the whole smart phone industry, and has become the core selling point and research direction of major manufacturers.

However, front camera, loudspeaker and other components still need to be set on the top of the smart phone, which hinders the continuous improvement of the screen-to-body ratio of smart phone.

SUMMARY

At least one embodiment of the present disclosure provides a liquid crystal display panel, including: a display region, including a plurality of sub-pixels; and an opening region in the display region, the display region includes a first edge and a second edge opposite to the first edge, the display region includes a first region and a second region, the first region is between the opening region and the first edge, the second region is between the opening region and the second edge, an orthographic projection of the opening region on the first edge respectively coincides with orthographic projections of the first region and the second region on the first edge, the plurality of sub-pixels include a main sub-pixel in the first region and a secondary sub-pixel of the second region, and an area of the main sub-pixel is smaller than an area of the secondary sub-pixel.

For example, in the liquid crystal display panel provided by an embodiment of the present disclosure, the opening region includes an opening and an opening frame surrounding the opening, the opening penetrates the liquid crystal display panel, and at least a part of signal lines connecting the first region and the second region passes through the opening region.

For example, in the liquid crystal display panel provided by an embodiment of the present disclosure, the plurality of sub-pixels are arranged in an array along a first direction and a second direction perpendicular to the first direction, the first region, the opening region and the second region are arranged along the first direction, and a size of the main sub-pixel in the second direction is smaller than a size of the secondary sub-pixel in the second direction.

For example, in the liquid crystal display panel provided by an embodiment of the present disclosure, the first direction is a column direction, the second direction is a row direction, and a number of main sub-pixels in each row of the first region is greater than a number of secondary sub-pixels in each row of the second region.

For example, in the liquid crystal display panel provided by an embodiment of the present disclosure, the main sub-pixels include main sub-pixels of N colors, and the secondary sub-pixels include secondary sub-pixels of N colors; a number of the main sub-pixels in each row of the first region is P times of N, and numbers of main sub-pixels of different colors are the same; a number of the secondary sub-pixels in each row of the second region is Q times of N, and numbers of secondary sub-pixels of different colors are the same; N is a positive integer greater than or equal to 3, and P and Q are positive integers greater than or equal to 1.

For example, in the liquid crystal display panel provided by an embodiment of the present disclosure, P/Q is any one selected from the group consisting of 5/4, 3/2, and 5/3.

For example, in the liquid crystal display panel provided by an embodiment of the present disclosure, the signal lines include data lines, and N×Q data lines in N×P data lines of the main sub-pixels in the first region extend to the second region through the opening frame and are connected to the secondary sub-pixels.

For example, in the liquid crystal display panel provided by an embodiment of the present disclosure, the first direction is a row direction, the second direction is a column direction, the second region, the opening region, and the first region are arranged along the row direction, and a number of main sub-pixels in each column of the first region is greater than a number of secondary sub-pixels in each column of the second region.

For example, in the liquid crystal display panel provided by an embodiment of the present disclosure, the first region includes G rows of main sub-pixels, the second region includes H rows of secondary sub-pixels, and the signal lines include gate lines, H gate lines of G gate lines of the main sub-pixels of the first region extend to the second region through the opening frame and are connected to the secondary sub-pixels, G and H are positive integers greater than or equal to 1, and H is smaller than G.

For example, in the liquid crystal display panel provided by an embodiment of the present disclosure, the plurality of sub-pixels are arranged in an array along a first direction and a second direction perpendicular to the first direction, the first region, the opening region and the second region are arranged along the first direction, and a size of the main sub-pixel of the first region in the first direction is smaller than a size of the secondary sub-pixel of the second region in the first direction.

For example, in the liquid crystal display panel provided by an embodiment of the present disclosure, a distance between the opening region and the second edge is smaller than a distance between the opening region and the first edge.

For example, in the liquid crystal display panel provided by an embodiment of the present disclosure, a distance between the opening region and the second edge is smaller than one eighth of a distance between the opening region and the first edge.

For example, in the liquid crystal display panel provided by an embodiment of the present disclosure, a position of the first edge is configured to place a backlight.

For example, the liquid crystal display panel provided by an embodiment of the present disclosure further includes: an array substrate; an opposed substrate, opposite to the array substrate; and a liquid crystal layer, between the array substrate and the opposed substrate, the opening frame further includes a frame sealant to seal liquid crystal in the liquid crystal layer outside the opening.

At least one embodiment of the present disclosure further provides a display device, including the abovementioned liquid crystal display panel and a side-in backlight module, including a backlight source, the backlight source is located at a position where the first edge is located.

For example, in the display device provided by an embodiment of the present disclosure, the display device further includes an image acquisition element, located in the opening region.

BRIEF DESCRIPTION OF THE DRAWINGS

In order to clearly illustrate the technical solution of embodiments of the present disclosure, the drawings of the embodiments will be briefly described in the following, it is obvious that the drawings in the description are only related to some embodiments of the present disclosure and not limited to the present disclosure.

DETAILED DESCRIPTION

Figure 1:
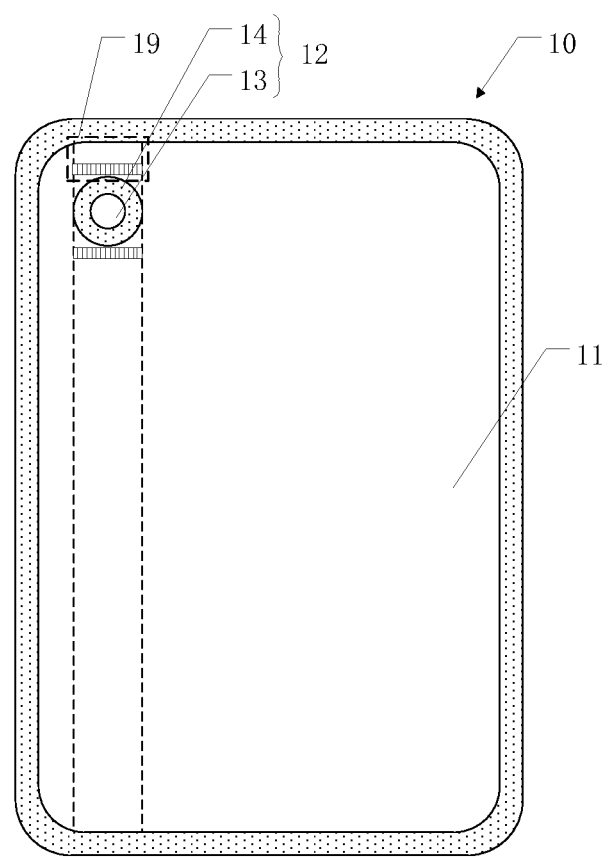
FIG. 1 is a plan view of a liquid crystal display panel.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

In order to further improve the screen-to-body ratio of smart phone and improve the integrity of smart phone, an opening or openings can be formed on a display panel of smart phone to integrate a front camera or other components on the display panel. However, inventor(s) of the present application has noticed that: in the case where a hole is dug in the liquid crystal display panel to form an opening, a backlight module of the liquid crystal display panel will also be formed with an opening, and a light guide plate of the backlight module will also be formed with an opening. In this case, light guide performance of the light guide plate will be affected, and the backlight brightness of a region on a side of the opening away from the light source (side-in light source) of the backlight module will be reduced, which will cause the display brightness in the region on the side of the opening away from the light source of the backlight module on the liquid crystal display panel to be reduced, and the picture will be darkened. On the other hand, in the case where the liquid crystal display panel is dug to form an opening, an opening frame is also needed around the opening to isolate the opening from the liquid crystal layer, backlight module and other components of the liquid crystal display panel, so as to prevent the liquid crystal from flowing out of the opening, light leakage and other defects. In this case, the opening frame is also used for the wiring of gate lines and data lines, and more gate lines and data lines will also make the width of the opening frame higher, thereby affecting the display effect.

Figure 2:
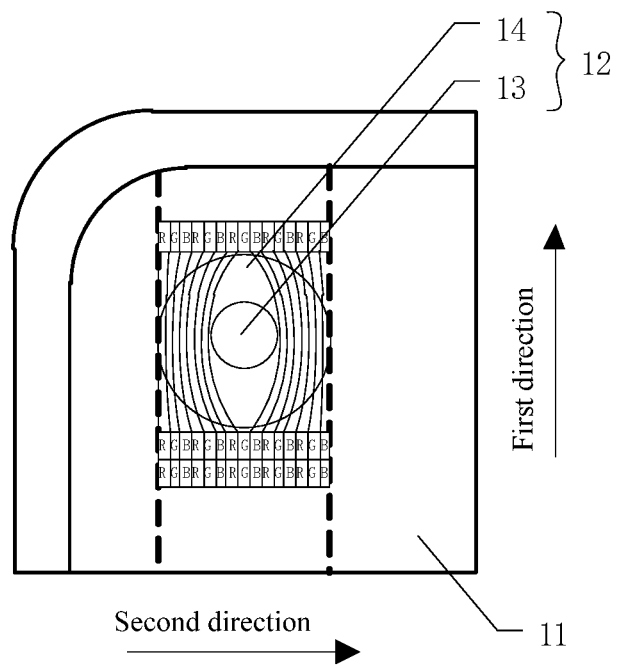
FIG. 2 is a partially enlarged diagram of a liquid crystal display panel shown in FIG. 1.

FIG. 1 is a plan view of a liquid crystal display panel. As illustrated by FIG. 1, the liquid crystal display panel 10 includes a display region 11 and an opening region 12 in the display region 11; the display region 11 can be used for displaying a picture, the opening region 12 includes an opening 13 and an opening frame 14 surrounding the opening 13, and the opening 13 can be used for placing a component such as a front camera. As illustrated by FIG. 1, in the case where a backlight module (not shown) of a display device adopting the liquid crystal display panel 10 is an edge-type backlight module, a backlight source of the backlight module is disposed at an edge of the display panel 10, upon a hole being dug in the liquid crystal display panel 10 to form the opening region 12, the backlight module of the liquid crystal display panel will also be formed with an opening, and the light guide plate of the backlight module will also be formed with an opening. In this case, the light guide performance of the light guide plate will be affected, and the backlight brightness of a region of the opening region away from the edge of the light source adopted by the backlight module will be reduced, which will cause the display brightness in the region of the opening region 12 away from the light source of the backlight module on the display device to be reduced, and the picture will be darkened, that is, the brightness in the region shown in the dotted line box 19 in FIG. 1 will be reduced, and the picture will be darkened. FIG. 2 is a partially enlarged diagram of a liquid crystal display panel shown in FIG. 1. As illustrated by FIG. 2, in the case where the liquid crystal display panel 10 is dug to form an opening region 12, it is also needed to form an opening frame 14 around the opening 13 to isolate the opening from the liquid crystal layer, backlight module and other components of the liquid crystal display panel 10, so as to prevent the liquid crystal from flowing out of the opening, light leakage and other defects. In this case, the opening frame 14 is also used for the wiring of gate lines and data lines, and more gate lines and data lines will also make the width of the opening frame higher, so that a proportion of the opening region 12 in the display region increases, thereby affecting the display effect.

Embodiments of the present disclosure provide a liquid crystal display panel and a display device. The liquid crystal display panel includes a display region and an opening region in the display region; the display region includes a plurality of sub-pixels, the display region includes a first edge and a second edge opposite to the first edge, the display region includes a first region and a second region, the first region is between the opening region and the first edge, the second region is between the opening region and the second edge, and an orthographic projection of the opening region on the first edge respectively coincides with orthographic projections of the first region and the second region on the first edge; the plurality of sub-pixels include a main sub-pixel in the first region and a secondary sub-pixel of the second region, and an area of the main sub-pixel is smaller than an area of the secondary sub-pixel. By means of increasing the area of the secondary sub-pixel of the second region, an opening ratio of the secondary sub-pixel can be increased, so as to improve the light transmittance of the second region; upon the backlight brightness of the second region decreasing due to the opening area of the liquid crystal display panel, by means of increasing the light transmittance of the second region, the brightness of the second region and the first region can be more uniform, so as to improve the brightness uniformity of the entire liquid crystal display panel.

Hereinafter, the liquid crystal display panel and display device provided by the embodiments of the present disclosure will be described in detail with reference to the drawings.

Figure 3:
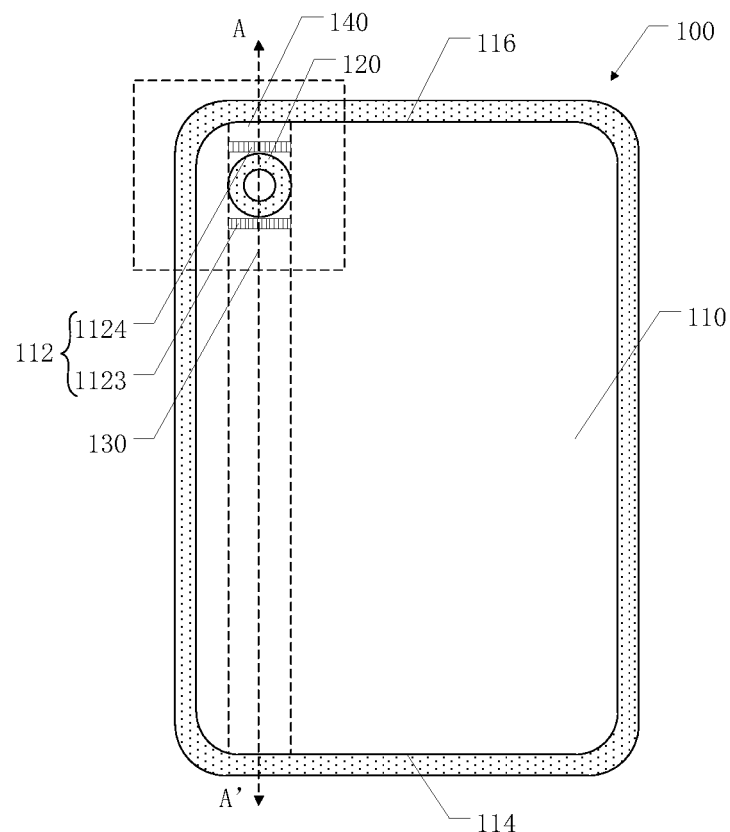
FIG. 3 is a schematic diagram of a liquid crystal display panel provided by an embodiment of the present disclosure.
Figure 4:
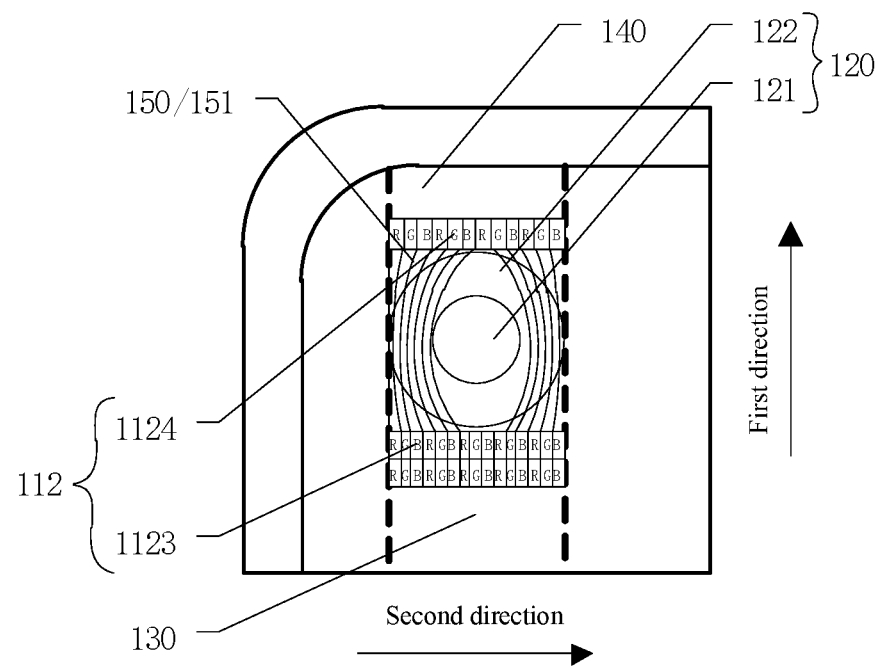
FIG. 4 is a partially enlarged schematic diagram of a liquid crystal display panel provided by an embodiment of the present disclosure at a position shown in a dotted box in FIG. 3.

An embodiment of the present disclosure provides a liquid crystal display panel. FIG. 3 is a schematic diagram of a liquid crystal display panel provided by an embodiment of the present disclosure. FIG. 4 is a partially enlarged schematic diagram of a liquid crystal display panel provided by an embodiment of the present disclosure at a position shown in a dotted box in FIG. 3. As illustrated by FIG. 3, the liquid crystal display panel 100 includes a display region 110 and an opening region 120 in the display region 110; the display region 110 includes a plurality of sub-pixels 112 for displaying; the display region 110 includes a first edge 114 and a second edge 116 opposite to the first edge 114, and the first edge 114 can be used for placing a backlight source of a backlight module of the liquid crystal display panel, and a display region 110 includes a first region 130 between the opening region 120 and the first edge 114 and a second region 140 between the opening region 120 and the second edge 116. An orthographic projection of the opening region on the first edge 114 respectively coincides with orthographic projections of the first region 130 and the second region 140 on the first edge 114, that is to say, a region located on a side of the opening region 120 close to the first edge 114 is the first region 130, namely, a normal display region, a region on a side of the opening region 120 away from the first edge 114 is the second region 140. As illustrated by FIG. 4, the plurality of sub-pixels 112 include a main sub-pixel 1123 of the first region 130 and a secondary sub-pixel 1124 of the second region 140, and an area of the main sub-pixel 1123 is smaller than an area of the secondary sub-pixel 1124. It is to be noted that an area of the display region other than the first region and the second region may have the same main sub-pixel as the first region.

In the liquid crystal display panel provided by the embodiment of the present disclosure, the area of the main sub-pixel 1123 of the first region 130 is smaller than the area of the secondary sub-pixel 1124 of the second region 140, so the secondary sub-pixel 1124 may have a higher opening ratio, thus having a higher light transmittance. That is to say, the liquid crystal display panel provided in the present embodiment can increase the opening ratio of the secondary sub-pixel, so as to improve the light transmittance of the second region; in the case where the backlight brightness of the second region of the liquid crystal display panel is reduced due to the opening region, the brightness of the second region and the first region can be more uniform by increasing the light transmittance of the second region, so as to improve the overall brightness uniformity of the entire liquid crystal display panel.

For example, in some examples, because a shape of the opening region 120 is circular, the first region 130 may include a first rectangular region between the opening region 120 and the first edge 114 and two heteromorphic triangles between the opening region 120 and the first rectangular region, the long edge of each of the heteromorphic triangles is an arc, and the second region 140 may include a second triangle between the opening region 120 and the second edge 116 and two heteromorphic triangles between the second rectangular region and the opening region 120. In this case, the pixel structure in the two heteromorphic triangles in the first region 130 is the same as that of the main sub-pixel 1123, and the pixel structure in the two heteromorphic triangles in the second region 140 is the same as that of the secondary sub-pixel 1124. Of course, the present disclosure includes, but is not limited to, the second region 140 may also include only the second rectangular region, excluding the two heteromorphic triangles described above. In this case, the pixel structure in the four heteromorphic triangles shown in FIG. 4 may be the same as that of the main sub-pixel 1123.

For example, in some examples, a distance between the opening region 120 and the second edge 116 is smaller than a distance between the opening region 120 and the first edge 114.

For example, in some examples, the distance between the opening region 120 and the second edge 116 is smaller than one eighth of the distance between the opening region 120 and the first edge 114.

For example, in some examples, as illustrated by FIG. 4, the opening region 120 includes an opening 121 and an opening frame 122 surrounding the opening 121, the opening 121 penetrates the liquid crystal display panel 100, and the opening frame 122 is provided with a signal line 150 of at least a part of sub-pixels 112 (including the main sub-pixels and the secondary sub-pixels) in the first region 130 and the second region 140. It should be noted that the opening frame 122 does not penetrate the entire liquid crystal display panel 100, and a frame sealant can be provided to isolate the opening 121 from a liquid crystal layer in the liquid crystal display panel 100.

For example, in some examples, as illustrated by FIG. 4, the plurality of sub-pixels 112 are arranged in an array in a first direction and a second direction perpendicular to the first direction, and a size of the main sub-pixel 1123 of the first region 130 in the second direction is smaller than a size of the secondary sub-pixel 1124 of the second region 140 in the second direction. Because the size of the main sub-pixel 1123 in the second direction is smaller than that of the secondary sub-pixel 1124 in the second direction, the area of the main sub-pixel 1123 is smaller than that of the secondary sub-pixel 1124, so that the light transmittance of the second region can be improved, and the brightness uniformity of the entire liquid crystal display panel can be improved For example, in some examples, in the case where the size of the main sub-pixel 1123 in the second direction is smaller than the size of the secondary sub-pixel 1124 in the second direction, the size of the main sub-pixel 1123 in the first direction is equal to the size of the secondary sub-pixel 1124 in the first direction. Thus, while ensuring that the area of the main sub-pixel 1123 is smaller than the area of the secondary sub-pixel 1124, the size of the main sub-pixel 1123 in the first direction is equal to the size of the secondary sub-pixel 1124 in the first direction, which can avoid poor display caused by the size difference between the main sub-pixel 1123 and the secondary sub-pixel 1124 in the first direction, thus improving the display quality.

For example, in some examples, as illustrated by FIG. 4, the first region 130, the opening region 120, and the second region 140 are arranged in the first direction, and the size of the main sub-pixel 1123 of the first region 130 in the second direction is smaller than that of the secondary sub-pixel 1124 of the second region 140 in the second direction. While ensuring that the area of the main sub-pixel 1123 is smaller than the area of the secondary sub-pixel 1124, in the second direction, the number of the secondary sub-pixels 1124 of the second region 140 is correspondingly reduced, so that the number of signal lines (for example, gate lines or data lines) passing through the opening frame 122 can be reduced, so that the width of the opening frame 122 can be reduced. Thus, a proportion of the area of the opening region 120 to the area of the display region 110 can be reduced upon the size of the opening 121 being ensured to be constant; or, the size of the opening 121 can be increased to accommodate a larger front camera and other components upon the size of the opening region 120 being ensured to be constant.

For example, in some examples, as illustrated by FIG. 4, the first direction is a column direction arranged by the sub-pixels 112, the second direction is a row direction arranged by the sub-pixels 112, and the number of main sub-pixels 1123 of each row in the first region 130 is greater than the number of the secondary sub-pixels 1124 of each row in the second region 140. Thus, the number of data lines 151 that pass through the opening frame 122 and are electrically connected with the secondary sub-pixel 1124 can be reduced, so that the proportion of the area of the opening region 120 to the area of the display region 110 can be reduced upon the size of the opening 121 being kept unchanged; or, the size of the opening 121 can be increased to accommodate a larger front camera or other components upon the size of the opening region 120 being kept unchanged.

For example, in some examples, as illustrated by FIG. 4, the main sub-pixels 1123 include main sub-pixels 1123 of N colors, for example, the main sub-pixels 1123 of N colors include a red (R) main sub-pixel, a green (G) main sub-pixel, and a blue (B) main sub-pixel. The secondary sub-pixels include secondary sub-pixels of N colors, for example, the secondary sub-pixels 1124 of N colors include a red (R) secondary sub-pixel, a green (G) secondary sub-pixel, and a blue (B) secondary sub-pixel. It should be noted that the embodiments of the present disclosure include but are not limited thereto, and the number and type of N colors can be determined according to the actual situation. In this case, the number of main sub-pixels 1123 in each row of the first region 130 is P times of N and the numbers of main sub-pixels 1123 of different colors are the same, the number of secondary sub-pixels 1124 in each row of the second region 140 is Q times of N and the numbers of secondary sub-pixels 1124 of different colors are the same, so as to ensure that the color can still be displayed normally in the case of the reduction of the number of secondary sub-pixels 1124, thereby avoiding color bias and other defects, in which N is a positive integer greater than or equal to 3, and P and Q are positive integers greater than or equal to 1.

For example, in some examples, as illustrated by FIG. 4, a ratio of P to Q is 5/4, that is, the ratio of the number of main sub-pixels 1123 in each row of the first region 130 to the number of secondary sub-pixels 1124 in each row of the second region 140 is 5/4, so that the width of the secondary sub-pixel 1124 in the row direction is 125% of the width of the main sub-pixel 1123 in the row direction, and the light transmittance of the second region 140 can be increased by about 25%; moreover, the number of data lines passing through the opening frame 122 is also reduced by 20%, so as to reduce the width of the opening frame 122. Of course, the embodiments of the present disclosure include but are not limited thereto, and the ratio of P to Q can be determined according to the proportion of backlight brightness reduction, so as to achieve the purpose that the brightness of the second region and the first region can be more uniform.

For example, in some examples, the signal lines 150 include data lines 151, and N×Q data lines of N×P data lines of the main sub-pixels 1123 of the first region 130 extend to the second region 140 through the opening frame 122 and are connected to the secondary sub-pixel 1124.

For example, FIG. 4 illustrates an example where N equals 3, P equals 5, and Q equals 4, that is, the number of main sub-pixels 1123 in each row of the first region 130 is 15, and the number of secondary sub-pixels 1124 in each row of the second region 140 is 12. As illustrated by FIG. 4, the data lines of the third pixel (i.e., the seventh main sub-pixel to the ninth main sub-pixel) counted from left to right in the first region 130 may not pass through the opening frame 122. The data lines 151 of the remaining twelve main sub-pixels 1123 in the first region 130 and twelve secondary sub-pixels 1124 in the second region 140 are connected one by one.

Figure 5:
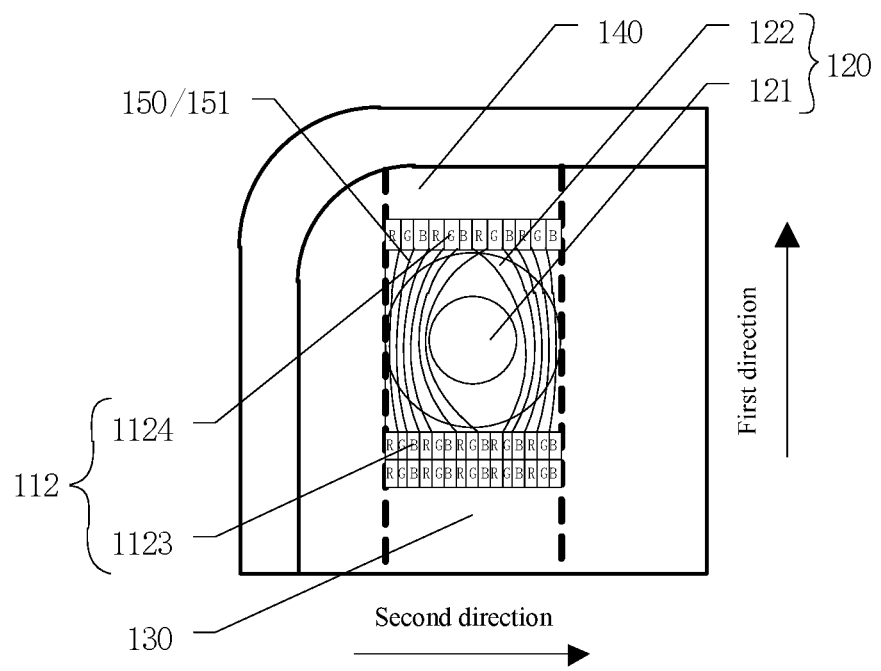
FIG. 5 is a partially enlarged schematic diagram of another liquid crystal display panel provided by an embodiment of the present disclosure at a position shown by the dotted box in FIG. 3.

FIG. 5 is a partially enlarged diagram of another liquid crystal display panel provided by an embodiment of the present disclosure at the position shown by the dotted box in FIG. 3. FIG. 5 also takes the case where N equals 3, P equals 5 and Q equals 4 as an example. Different from the liquid crystal display panel shown in FIG. 4, the data lines of the sixth main sub-pixel, the eighth main sub-pixel and the tenth main sub-pixel in the first region 130 in FIG. 5, which are counted from left to right, may not pass through the opening frame 122. The data lines 151 of the remaining twelve main sub-pixels 1123 in the first region 130 and the twelve secondary sub-pixels 1124 in the second region 140 are connected one by one.

Figure 6:
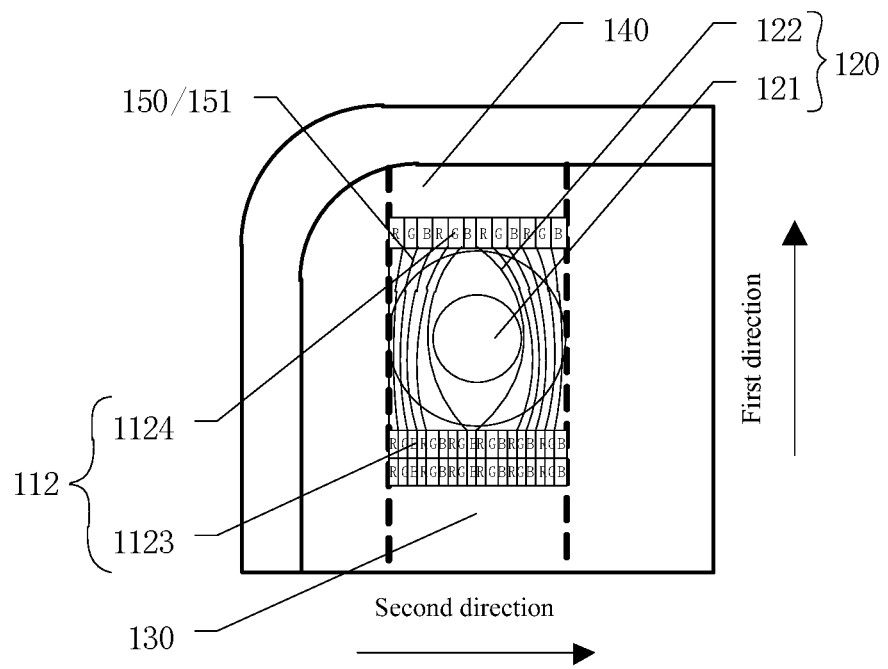
FIG. 6 is a partially enlarged schematic diagram of another liquid crystal display panel provided by an embodiment of the present disclosure at the position shown by the dotted box in FIG. 3.
Figure 7:
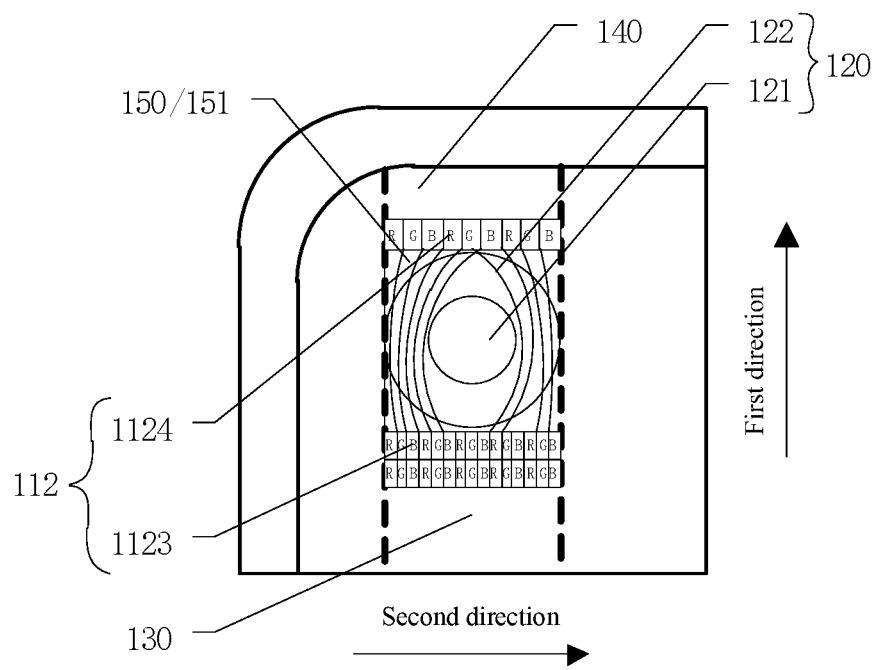
FIG. 7 is a partially enlarged schematic diagram of another liquid crystal display panel provided by an embodiment of the present disclosure at the position shown by the dotted box in FIG. 3.

FIG. 6 is a partially enlarged diagram of another liquid crystal display panel provided by an embodiment of the present disclosure at the position indicated by the dotted box in FIG. 3; FIG. 7 is a partially enlarged diagram of another liquid crystal display panel provided by an embodiment of the present disclosure at the position shown by the dotted box in FIG. 3. As illustrated by FIG. 6, the ratio of P to Q is 3/2, that is, the ratio of the number of the main sub-pixels 1123 in each row of the first region 130 to the number of the secondary sub-pixels 1124 in each row of the second region 140 is 3/2; as illustrated by FIG. 7, the ratio of P to Q is 5/3, that is, the ratio of the number of the main sub-pixels 1123 in each row of the first region 130 to the number of the secondary sub-pixels 1124 in each row of the second region 140 is 5/3.

For example, FIG. 6 illustrates an example where N equals 3, P equals 6, and Q equals 4, that is, the number of the main sub-pixels 1123 of each row in the first region 130 is 18, and the number of the secondary sub-pixels 1124 of each row in the second region 140 is 12. As illustrated by FIG. 6, the data lines of the sixth main sub-pixel, the seventh main sub-pixel, the eighth main sub-pixel, the eleventh main sub-pixel, the twelfth main sub-pixel and the thirteenth main sub-pixel counted from left to right in the first region 130 may not pass through the opening frame 122. The data lines 151 of the remaining twelve main sub-pixels 1123 in the first region 130 and the twelve sub-pixels 1124 in the second region 140 are connected one by one.

For example, FIG. 7 takes the case where N equals 3, P equals 5, Q equals 3 as an example, that is, the number of main sub-pixels 1123 in each row of the first region 130 is 15, and the number of the secondary sub-pixels 1124 in each row of the second region 140 is 9. As illustrated by FIG. 7, the data lines of the sixth main sub-pixel, the seventh main sub-pixel, the eighth main sub-pixel, the eleventh main sub-pixel, the twelfth main sub-pixel and the thirteenth main sub-pixel in the first region 130, counted from left to right, may not pass through the opening frame 122. The data lines 151 of the remaining twelve main sub-pixels 1123 in the first region 130 and the twelve secondary sub-pixels 1124 in the second region 140 are connected one by one.

It should be noted that the embodiments of the disclosure include but are not limited to the specific examples shown in FIGS. 4-7. The specific values of N, P and Q can be changed according to the actual situation, and the specific connection modes of the main sub-pixels and the secondary sub-pixels can also be selected according to the actual situation.

For example, in some examples, a plurality of sub-pixels are arranged in an array along a first direction and a second direction perpendicular to the first direction, and the size of the main sub-pixel of the first region in the first direction may be smaller than the size of the secondary sub-pixel of the second region in the first direction, so as to realize that the area of the main sub-pixel of the first region is smaller than the area of the secondary sub-pixel of the second region.

Figure 8:
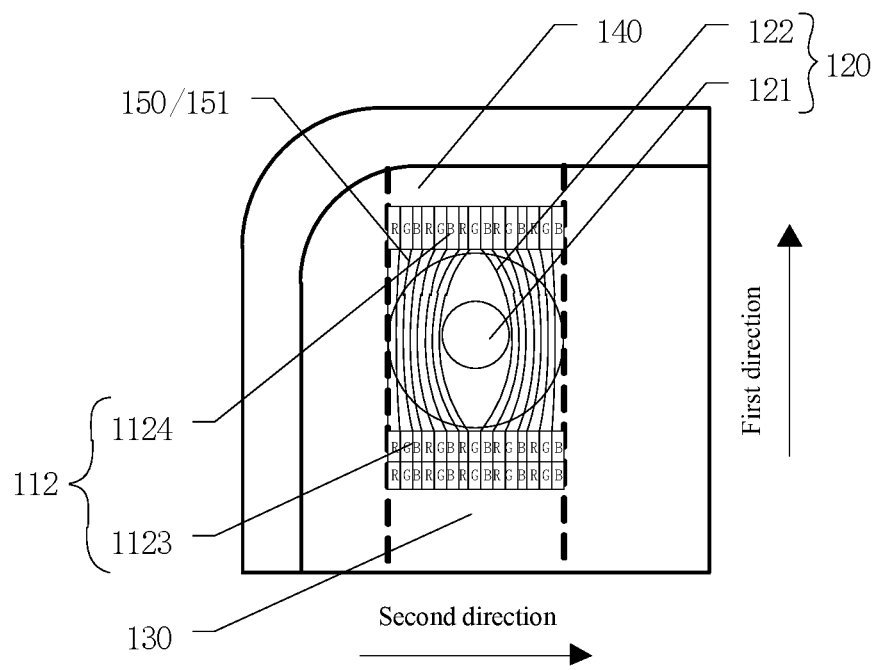
FIG. 8 is a partially enlarged schematic diagram of another liquid crystal display panel provided by an embodiment of the present disclosure at the position shown by the dotted box in FIG. 3.

FIG. 8 is a partially enlarged schematic diagram of another liquid crystal display panel provided by an embodiment of the present disclosure at the position shown by the dotted box in FIG. 3. As illustrated by FIG. 8, the first direction is the column direction arranged by the sub-pixels 112, and the second direction is the row direction arranged by the sub-pixels 112. The number of main sub-pixels 1123 in each row of the first region 130 is equal to the number of secondary sub-pixels 1124 in each row of the second region 140, that is, the size of the main sub-pixel 1123 in each row of the first region 130 in the row direction is equal to that of the secondary sub-pixel 1124 in each row of the second region 140 in the row direction. In this case, as illustrated by FIG. 8, the size of the secondary sub-pixel 1124 of each row of the second region 140 in the column direction can be increased to increase the area of the secondary sub-pixel 1124 of each row of the second region 140.

Figure 9:
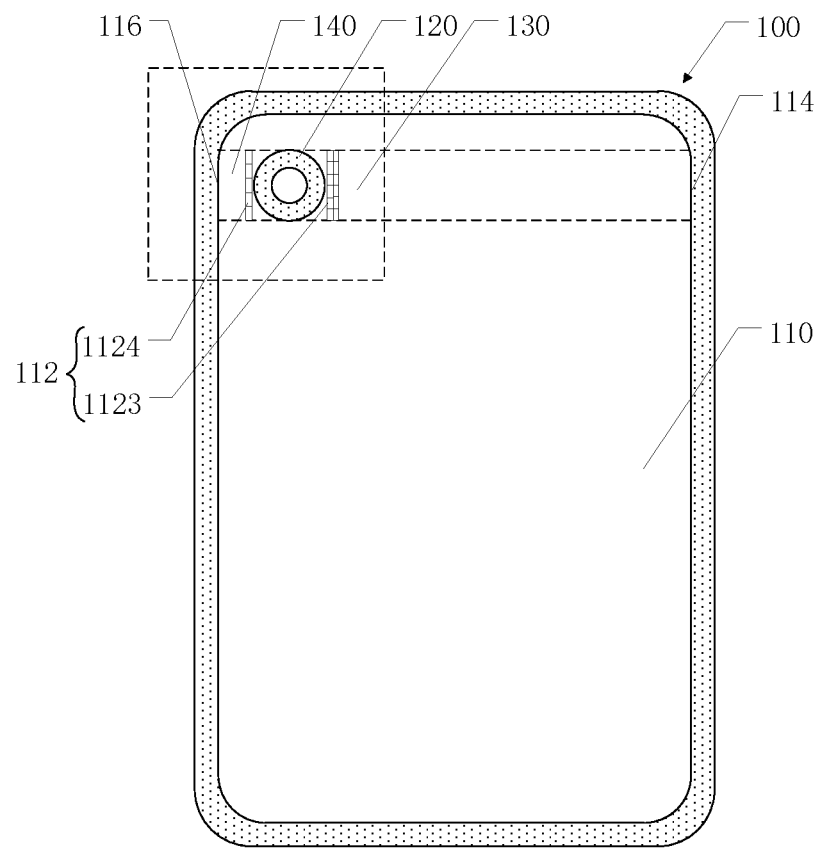
FIG. 9 is a plan view of another liquid crystal display panel provided by an embodiment of the present disclosure.
Figure 10:
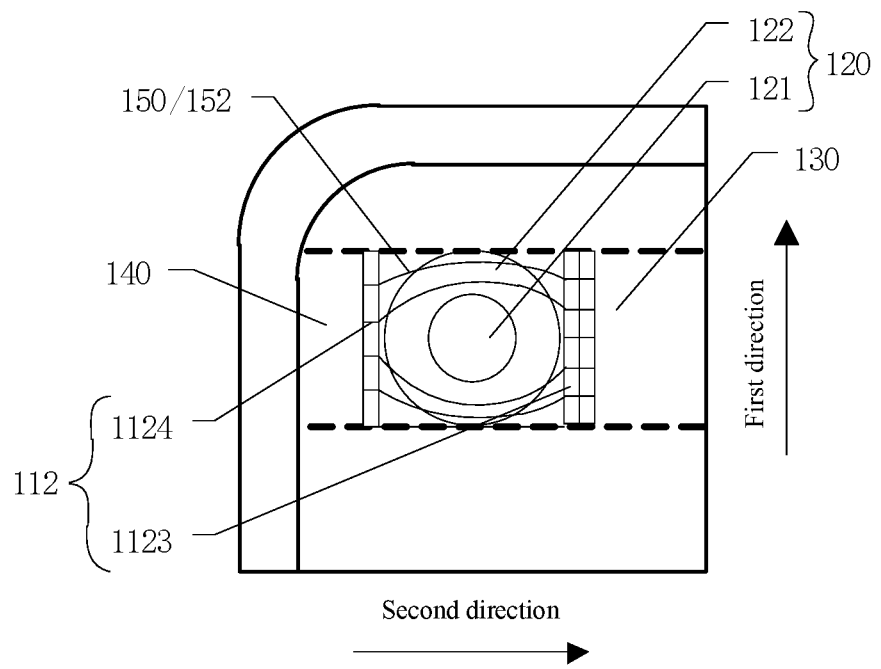
FIG. 10 is a partially enlarged schematic diagram of a liquid crystal display panel provided by an embodiment of the present disclosure in the dotted box shown in FIG. 9.

FIG. 9 is a plan view of another liquid crystal display panel provided by an embodiment of the present disclosure. FIG. 10 is a partially enlarged schematic diagram of a liquid crystal display panel provided by an embodiment of the present disclosure in the dotted box shown in FIG. 9. The backlight source in the liquid crystal display panel shown in FIG. 9 and FIG. 10 is located at a right edge as illustrated by figures, that is, the first edge 114 is located at the right edge of the liquid crystal display panel. As illustrated by FIG. 9 and FIG. 10, the first direction is the column direction arranged by the sub-pixels 112, the second direction is the row direction arranged by the sub-pixels 112, the second region 140, the opening region 120, and the first region 130 are arranged along the row direction, the number of main sub-pixels 1123 in each column of the first region 130 is greater than the number of secondary sub-pixels 1124 in each column of the second region 140. In this case, number of gate lines 152 that pass through the opening frame 122 and are electrically connected with the secondary sub-pixels 1124 can be reduced, so that the proportion of the area of the opening region 120 and the area of the display region 110 can be reduced upon the size of the opening 121 being kept unchanged; or, the size of the opening 121 can be increased to accommodate a larger size of the front camera or other components upon the size of the opening region 120 being kept unchanged. It should be noted that in this case, the first edge 114 is located on a lateral edge of the liquid crystal display panel.

For example, in some examples, the first region includes G rows of main sub-pixels, the second region includes H rows of secondary sub-pixels, and the signal lines include gate lines. H gate lines in G gate lines of the main sub-pixels of the first region extends to the second region through the opening frame and are connected to the secondary sub-pixels, where G and H are positive integers greater than or equal to 1.

For example, FIG. 10 illustrates with an example where G equals 6 and H equals 5, that is, the first region includes six rows of main sub-pixels and the second region includes five rows of secondary sub-pixels. As illustrated by FIG. 10, the gate lines 152 of the fourth row of main sub-pixels counted from bottom to top in the first region 130 may not pass through the opening frame 122. Gate lines 152 of the remaining five rows of main sub-pixels 1123 of the first region 130 and the five rows of secondary sub-pixels 1124 of the second region 140 are connected one by one.

For example, in some examples, the plurality of sub-pixels are arranged in an array in a first direction and a second direction perpendicular to the first direction, and the size of the main sub-pixel of the first region in the first direction may be smaller than the size of the secondary sub-pixel of the second region in the first direction, so as to realize that the area of the main sub-pixel of the first region is smaller than the area of the secondary sub-pixel of the second region.

Figure 11:
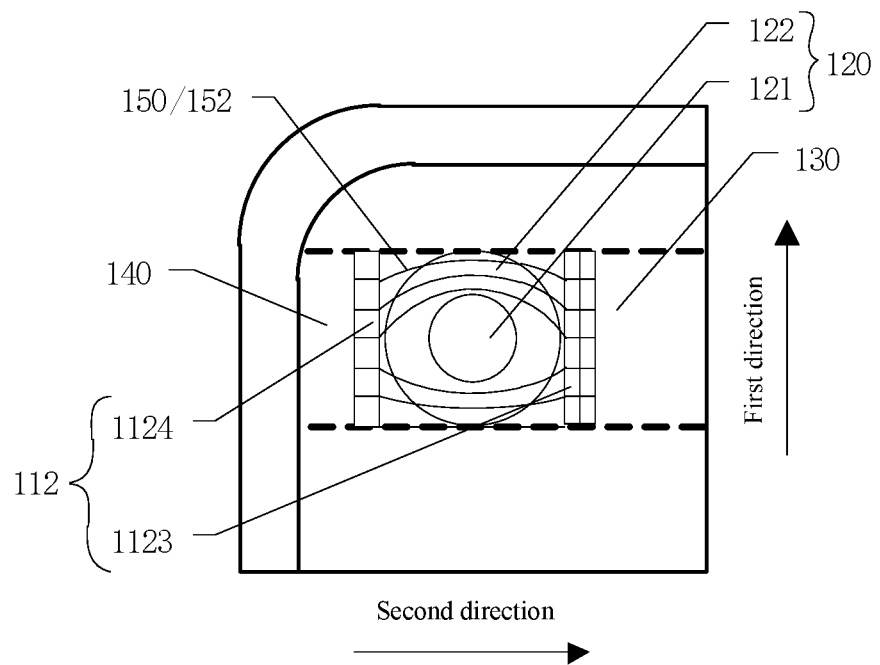
FIG. 11 is a partially enlarged schematic diagram of another liquid crystal display panel provided by an embodiment of the present disclosure at the position shown by the dotted box in FIG. 9.

FIG. 11 is a partially enlarged schematic diagram of another liquid crystal display panel provided by an embodiment of the present disclosure at the position shown by the dotted box in FIG. 9. The first direction is the column direction arranged by the sub-pixels 112, and the second direction is the row direction arranged by the sub-pixels 112, as illustrated by FIG. 11, G=H, that is, the number of rows of the main sub-pixels 1123 of the first region 130 is equal to the number of rows of the secondary sub-pixels 1124 of the second region 140, that is, the size of the main sub-pixel 1123 of the first region 130 in the column direction is the same as that of the secondary sub-pixel 1124 of the second region 140 in the column direction. In this case, as illustrated by FIG. 11, the size of the secondary sub-pixel 1124 of the second region 140 in the row direction can be increased to increase the area of the secondary sub-pixel 1124 of the second region 140.

Figure 12:
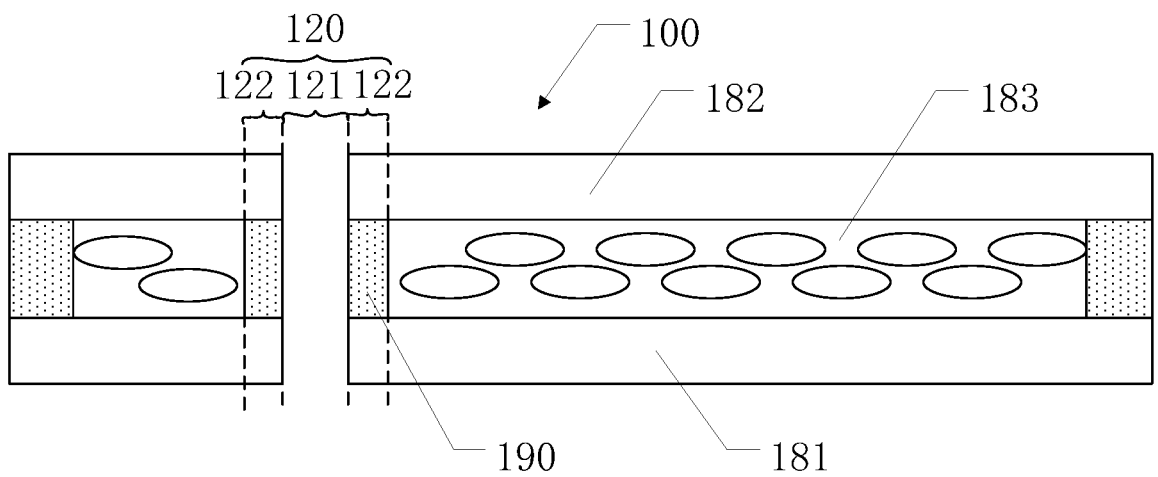
FIG. 12 is a sectional diagram of a liquid crystal display panel provided by an embodiment of the present disclosure in a direction of AA' in FIG. 3.

FIG. 12 is a sectional diagram of a liquid crystal display panel provided by an embodiment of the present disclosure in the direction of AA' in FIG. 3. As illustrated by FIG. 12, the liquid crystal display panel 100 includes an array substrate 181, an opposed substrate 182, and a liquid crystal layer 183; the array substrate 181 and the opposed substrate 182 are disposed opposite to each other, and the liquid crystal layer 183 is located between the array substrate 181 and the opposed substrate 182. The opening frame 120 also includes a frame sealant 190 to seal the liquid crystal in the liquid crystal layer 183 outside the opening 121.

Figure 13:
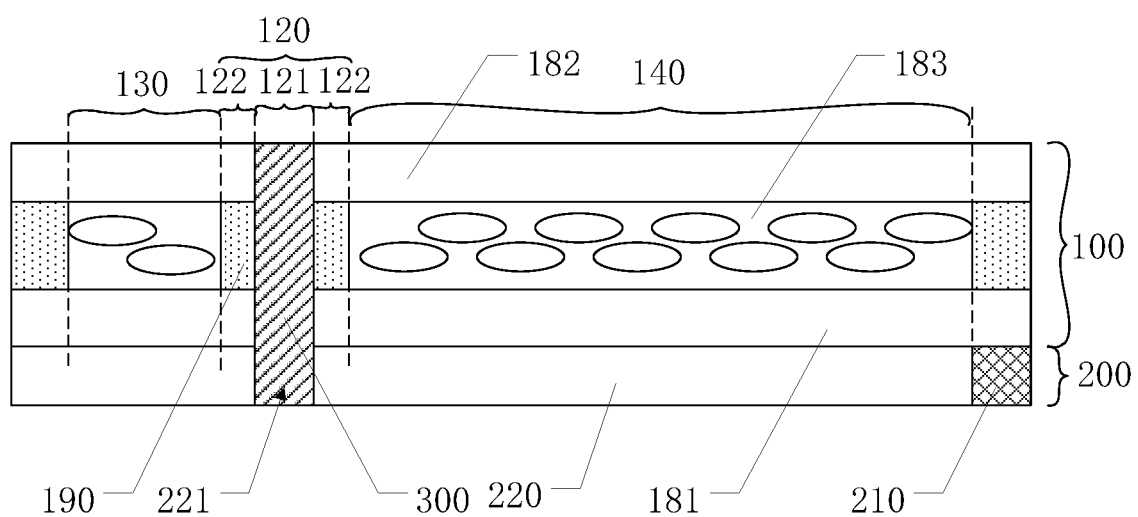
FIG. 13 is a sectional diagram of a display device provided by an embodiment of the present disclosure.

At least one embodiment of the present disclosure also provides a display device. FIG. 13 is a sectional diagram of a display device according to the present disclosure. As illustrated by FIG. 13, the display device includes any one of the liquid crystal display panels 100 provided by the above embodiments and an edge-type backlight module 200; the backlight module 200 includes a backlight source 210, which is located at a position where the first edge 114 is located. Because the secondary sub-pixel 1124 of the second region 140 may have a higher opening ratio, thereby having a higher light transmittance. By means of increasing the light transmittance of the second region, the brightness of the second region and the first region can be more uniform, so as to improve the brightness uniformity of the entire liquid crystal display panel.

For example, as illustrated by FIG. 13, the backlight module 200 further includes a light guide plate 220, which has a through hole 221 corresponding to the opening 121 upon the liquid crystal display panel 100 being dug to form the opening 121. In this case, the light guide performance of the light guide plate will be affected, and the backlight brightness of the region of the opening region 120 away from the first edge 114, that is, the second region 140, will be reduced. However, because the secondary sub-pixels 1124 of the second region 140 may have a higher opening ratio, thus having a higher light transmittance. By means of increasing the light transmittance of the second region, the brightness of the second region and the first region can be more uniform, so as to improve the brightness uniformity of the entire liquid crystal display panel.

For example, in some examples, as illustrated by FIG. 13, the display device further includes an image acquisition element 300 in the opening 121. The image acquisition element 300 may be a camera.

For example, in the case where the display device is a mobile phone, the image acquisition element 300 may be a front camera.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

What have been described above are only specific implementations of the present disclosure, the protection scope of the present disclosure is not limited thereto, variations or replacements within the technical scope disclosed by the present disclosure which can be easily envisaged by any skilled in the art shall fall in the protection scope of the present disclosure. Thus, the protection scope of the present disclosure should be based on the protection scope of the claims.

What is claimed is:

1. A liquid crystal display panel, comprising:
a display region, comprising a plurality of sub-pixels; and
an opening region in the display region,
wherein the display region comprises a first edge and a second edge opposite to the first edge, the display region comprises a first region and a second region, the first region is between the opening region and the first edge, the second region is between the opening region and the second edge, an orthographic projection of the opening region on the first edge respectively coincides with orthographic projections of the first region and the second region on the first edge,
the plurality of sub-pixels comprise a main sub-pixel in the first region and a secondary sub-pixel of the second region, and an area of the main sub-pixel is smaller than an area of the secondary sub-pixel,
the plurality of sub-pixels are arranged in an array along a first direction and a second direction perpendicular to the first direction, the first region, the opening region and the second region are arranged along the first direction, and a size of the main sub-pixel in the second direction is smaller than a size of the secondary sub-pixel in the second direction, the first direction is a column direction, the second direction is a row direction, and a number of main sub-pixels in each row of the first region is greater than a number of secondary sub-pixels in each row of the second region.

2. The liquid crystal display panel according to claim 1, wherein the opening region comprises an opening and an opening frame surrounding the opening, the opening penetrates the liquid crystal display panel, and at least a part of signal lines connecting the first region and the second region passes through the opening region.

3. The liquid crystal display panel according to claim 1, wherein the main sub-pixels comprise main sub-pixels of N colors, and the secondary sub-pixels comprise secondary sub-pixels of N colors; a number of the main sub-pixels in each row of the first region is P times of N, and numbers of main sub-pixels of different colors are the same; a number of the secondary sub-pixels in each row of the second region is Q times of N, and numbers of secondary sub-pixels of different colors are the same; N is a positive integer greater than or equal to 3, and P and Q are positive integers greater than or equal to 1.

4. The liquid crystal display panel according to claim 3, wherein P/Q is any one selected from the group consisting of 5/4, 3/2, and 5/3.

5. The liquid crystal display panel according to claim 3, wherein the signal lines comprise data lines, and NxQ data lines in NxP data lines of the main sub-pixels in the first region extend to the second region through the opening frame and are connected to the secondary sub-pixels.

6. The liquid crystal display panel according to claim 1, wherein the first direction is a row direction, the second direction is a column direction, the second region, the opening region, and the first region are arranged along the row direction, and a number of main sub-pixels in each column of the first region is greater than a number of secondary sub-pixels in each column of the second region.

7. The liquid crystal display panel according to claim 6, wherein the first region comprises G rows of main sub-pixels, the second region comprises H rows of secondary sub-pixels, and the signal lines comprise gate lines, H gate lines of G gate lines of the main sub-pixels of the first region extend to the second region through the opening frame and are connected to the secondary sub-pixels, G and H are positive integers greater than or equal to 1, and H is smaller than G.

8. The liquid crystal display panel according to claim 2, wherein the plurality of sub-pixels are arranged in an array along a first direction and a second direction perpendicular to the first direction, the first region, the opening region, and the second region are arranged along the first direction, and a size of the main sub-pixel of the first region in the first direction is smaller than a size of the secondary sub-pixel of the second region in the first direction.

9. The liquid crystal display panel according to claim 1, wherein a distance between the opening region and the second edge is smaller than a distance between the opening region and the first edge.

10. The liquid crystal display panel according to claim 1, wherein a distance between the opening region and the second edge is smaller than one eighth of a distance between the opening region and the first edge.

11. The liquid crystal display panel according to claim 1, wherein a position of the first edge is configured to place a backlight.

12. The liquid crystal display panel according to claim 2, further comprising:
   an array substrate;
   an opposed substrate, opposite to the array substrate; and
   a liquid crystal layer, between the array substrate and the opposed substrate,
   wherein the opening frame further comprises a frame sealant to seal liquid crystal in the liquid crystal layer outside the opening.

13. A display device, comprises:
   the liquid crystal display panel according to claim 1; and
   a side-in backlight module, comprising a backlight source,
   wherein the backlight source is located at a position where the first edge is located.

14. The display device according to claim 13, further comprising:
   an image acquisition element, located in the opening region.

* * * * *